Nov. 9, 1971　　　　R. D. COLINET ET AL　　　　3,618,437
MACHINE FOR AND PROCESS OF DIE-CUTTING
Filed Sept. 8, 1969　　　　　　　　　　　　　　7 Sheets-Sheet 1

INVENTORS.
RENE D. COLINET
WILLIAM I. BULMASH
BY Jackson, Jackson
and Chovanes
ATTORNEYS.

INVENTORS.
RENE D. COLINET
WILLIAM I. BULMASH
BY Jackson Jackson
and Cholines
ATTORNEYS.

INVENTORS.
RENE D. COLINET
WILLIAM I. BULMASH
BY Jackson, Jackson
and Nolanes

ATTORNEYS.

INVENTORS.
RENE D. COLINET
WILLIAM I. BULMASH

ATTORNEYS.

Nov. 9, 1971   R. D. COLINET ET AL   3,618,437
MACHINE FOR AND PROCESS OF DIE-CUTTING
Filed Sept. 8, 1969   7 Sheets-Sheet 7
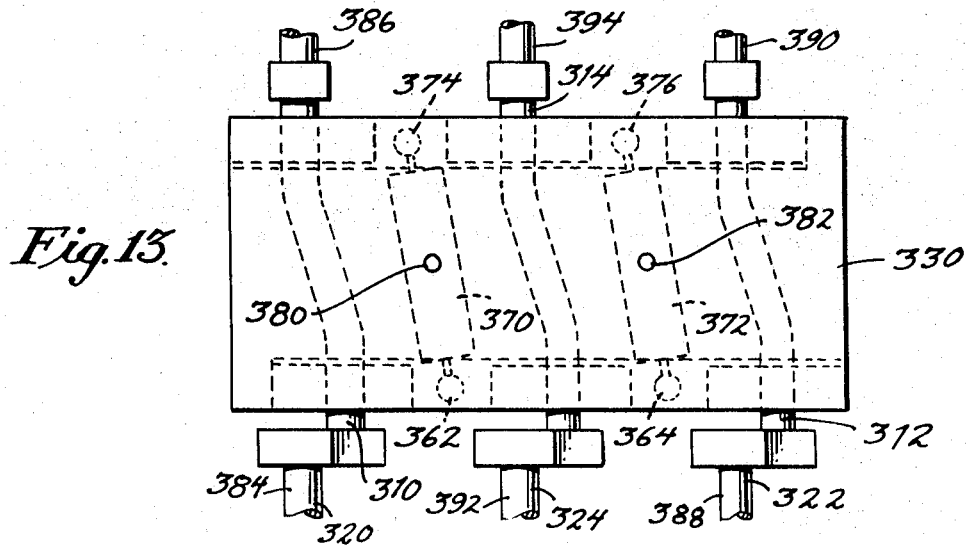
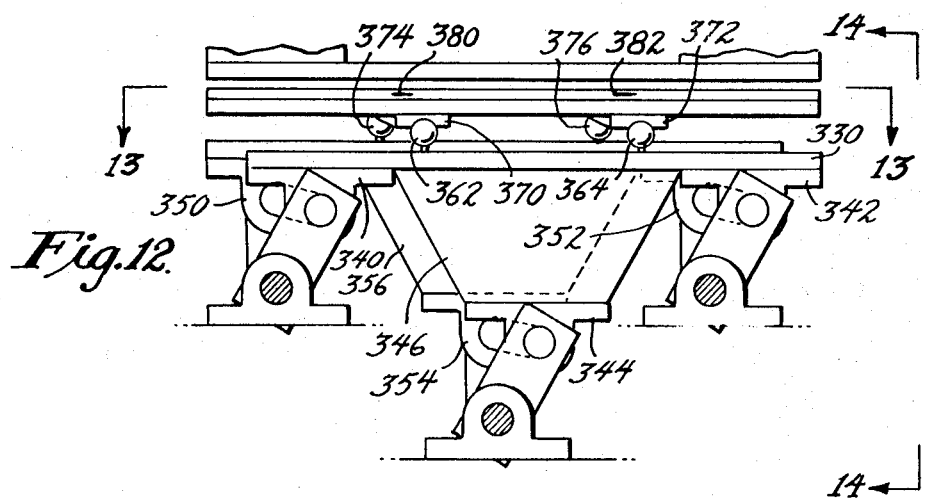
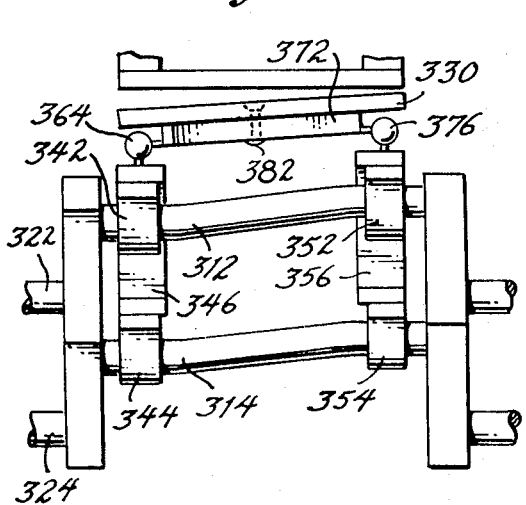
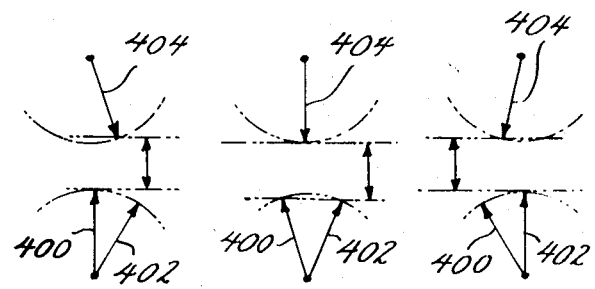
INVENTORS.
RENE D. COLINET
WILLIAM I. BULMASH
BY Jackson, Jackson
and Chovanes
ATTORNEYS.

United States Patent Office 3,618,437
Patented Nov. 9, 1971

3,618,437
MACHINE FOR AND PROCESS OF DIE-CUTTING
Rene D. Colinet, 4902 N. 13th St. 19141, and William I. Bulmash, 6600 N. 11th St. 19126, both of Philadelphia, Pa.
Filed Sept. 8, 1969, Ser. No. 855,905
Int. Cl. B26d 1/56; B23d 25/10
U.S. Cl. 83—37                    14 Claims

ABSTRACT OF THE DISCLOSURE

Die and backer, constantly facing each other, travel in circular paths which bring them close to each other with sheet material sandwiched between, all traveling at the same speed in the same direction, and then together to effect a contour cut. The two sides of the backer may be somewhat relatively dephased to produce a rocking component of motion and a rocking cut. Specific preferred structure includes shafts in sets of three and transmission of motion from below the sheet material to above it by pairs of lever arms attached to rollers in roller guides.

SUMMARY OF THE INVENTION

This invention relates to machines and processes for cutting of work by means of dies. Subject matter common to this case is embodied in continuation-in-part application, Ser. No. 81,853, filed Oct. 19, 1970 for Machine and Process of Die Cutting.

The work may for example be some paper-type material in sheet form, especially paper or cardboard.

Present commercial paper die-cutting presses, insofar as we are aware of them, belong to two classes:

(1) Reciprocating-motion platen presses, operating in the speed range of 100 to 200 strokes per minute.

(2) Purely rotary presses, operating in the speed range of 500 to 1,200 revolutions per minute.

The greater productivity of the rotary presses is due to constant speed of the moving parts, paper included, which are free from acceleration and deceleration inertia effects, but this advantage is offset by the high cost of the cylindrical matrices used on the rotary presses with which we are familiar. Such a curved die must be of individual design for the particular occasion, not reusable for a different pattern. The curvature is double and complex, since the contour of the paper cutting must be wrapped around a perfect cylinder. On the contrary the flat dies used with plane platens in the reciprocating machines cost very little because they are made of straight steel cutting rules simply bent sideways to the desired contour of the cut. This curvature is maintained by holding the bent steel strip by a plywood support. The price ratio of a rotary rule edged die compared to a flat die is approximately 100 to 1.

A purpose of the present invention is to provide a particular press useful for such things as die cutting of paper-type products, which press is an improvement over both of the above two particular commercial forms as known to us.

A purpose of the present invention is to combine the advantage of high productivity of the rotary presses with the low cost of the flat rule dies of the reciprocating presses.

A purpose is to do this by a machine which also has:

(a) Complete and correct balancing of all moving parts;

(b) Silent operation due to the elimination of all toothed gears, which also wear, as a result of friction between the teeth;

(c) Absence of the clearances between the teeth such as are normal in the absence of anti back-lash devices.

The proposed invention replaces the gears by rigid linkages having tight-fitting pivots such as pre-stressed ball or roller bearings or similar articulated means.

A purpose of the present invention is to cut material well with a minimum of expense and effort. This purpose is something that can be especially well accomplished in the case where sheet material is being cut, and/or where the cut is a contour type of cut.

Further purposes will be apparent from the remainder of the specification, and the claims.

BRIEF DESCRIPTION OF THE DRAWINGS

In the drawings we have chosen to illustrate certain only of the particular embodiments in which our invention may appear, the forms shown being chosen from the standpoints of convenience of illustration, satisfactory operation and clear demonstration of the principles involved.

FIG. 9 shows it in its shortest form, without any spacer.

FIG. 10 shows it in an exemplary lengthened form with a particular spacer.

FIG. 12 is a fragmentary side elevational view of a third embodiment involving a variation using side-rolling motion.

FIG. 13 is a fragmentary horizontal section, looking downward, along line 13—13 on FIG. 12.

FIG. 14 is a fragmentary elevational view from line 14—14 on FIG. 12.

FIG. 15 is a diagrammatic view illustrating the action in this third embodiment.

DESCRIPTION OF PARTICULAR EMBODIMENTS AND THE LIKE

Figure 1:
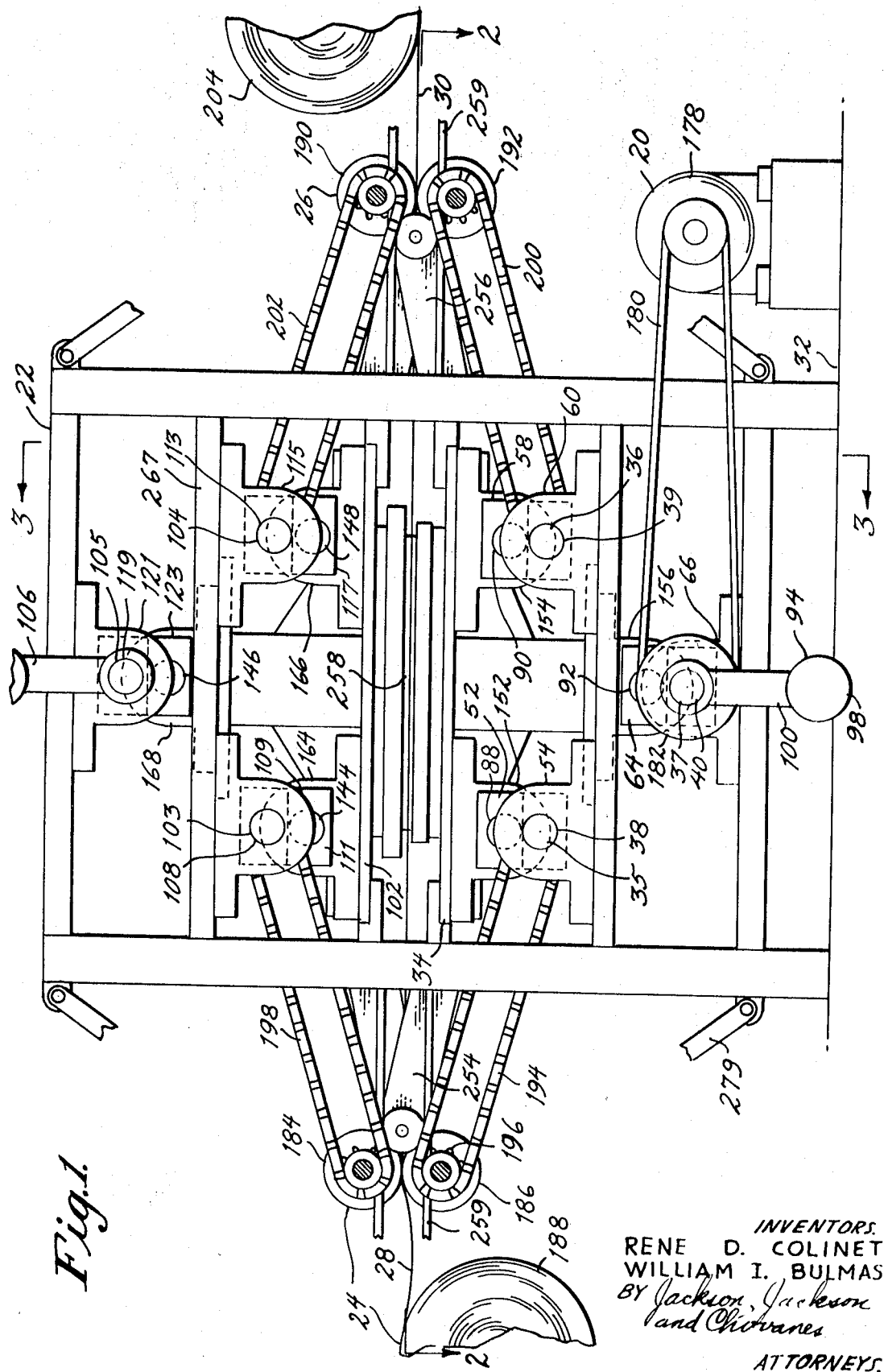
FIG. 1 is a side elevational view of a first embodiment of my invention. The view is somewhat fragmentary, with all, or a large part of, the supply and receiving rolls for the sheet material and the adjustment lever arms omitted.
Figure 2:
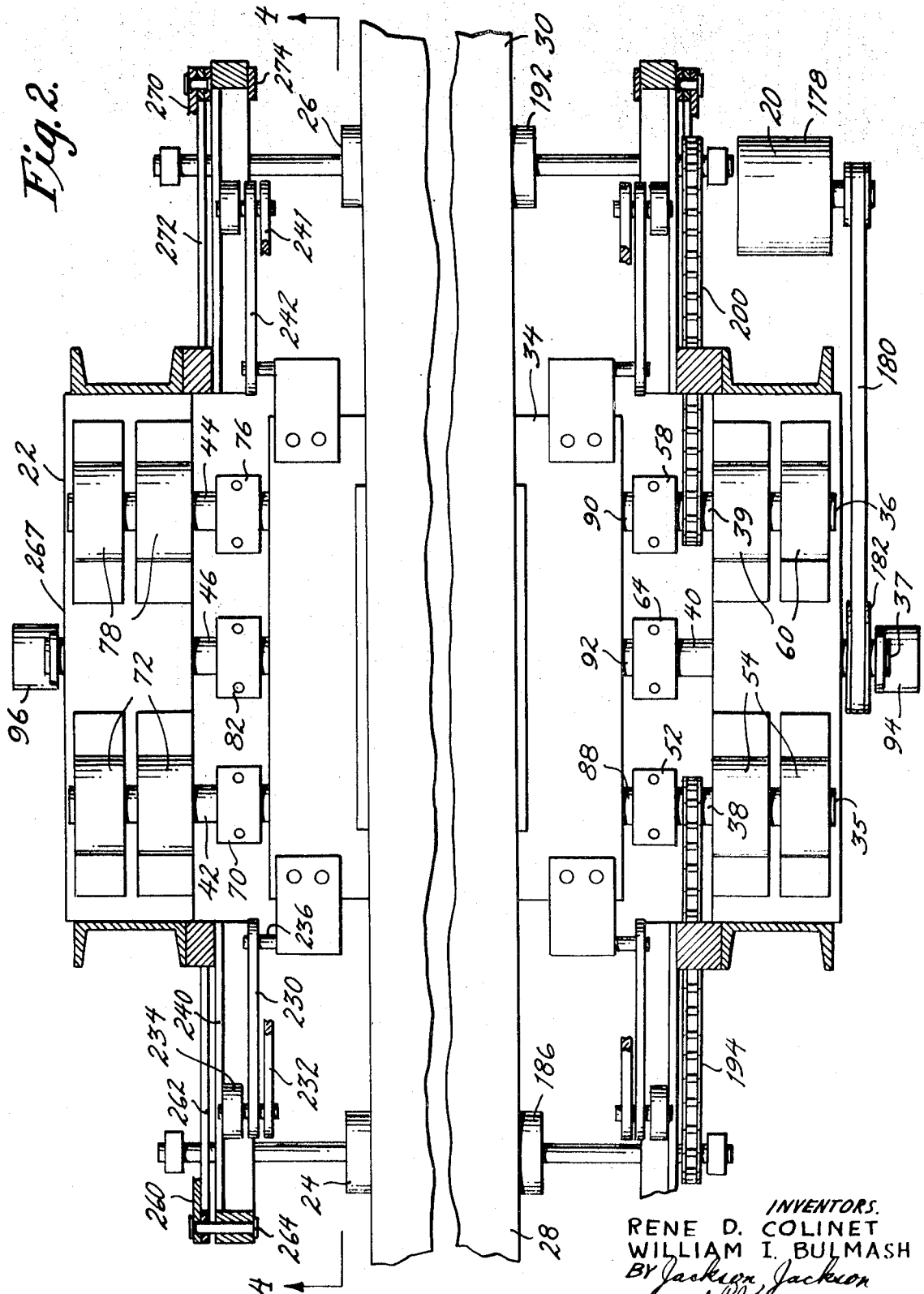
FIG. 2 is a fragmentary horizontal sectional view, looking downward, along the line 2—2 on FIG. 1, thus constituting mostly in effect a plan view of the lower half of this embodiment of my machine.
Figure 3:
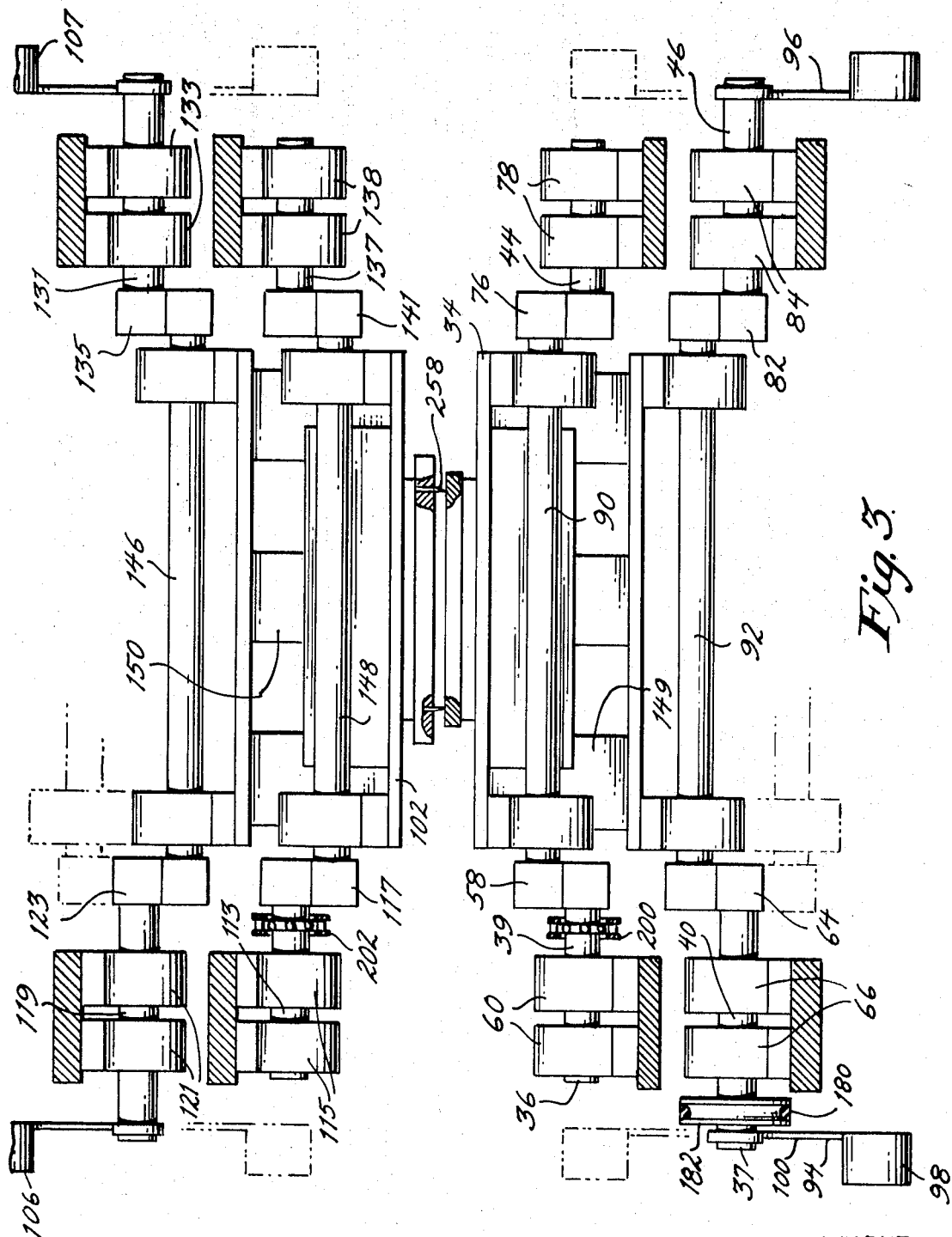
FIG. 3 is a somewhat fragmentary cross sectional view along the lines 3—3 on FIG. 1, with the platens broken away to better show the die.
Figure 7:
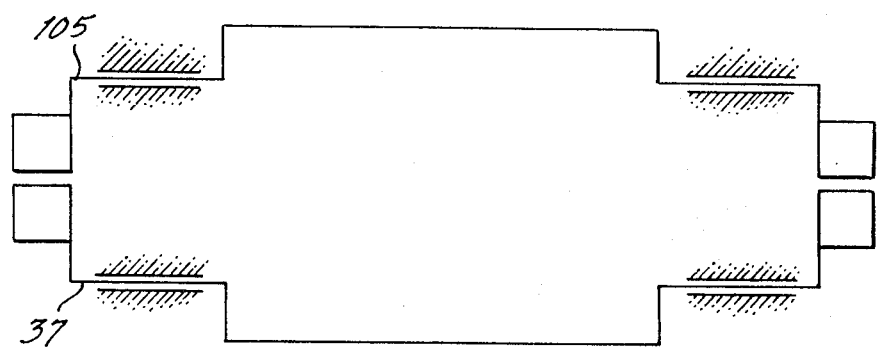
FIG. 7 is a diagrammatic view applicable to either of the above embodiments, to show balancing of the device.

Describing in illustration but not in limitation and referring to the drawings:

When the press of our invention is used for cutting paper or other sheet material which is relatively thin and easy to cut, the preferred form is that of the first embodiment shown especially in FIGS. 1 thru 5, together with any of the other figures which are applicable to more than one embodiment, as for example is the case with FIG. 7.

This includes driving means 20, central portion 22, which is mainly concerned with the die cutting, supplying end portion 24 and receiving end portion 26, which in this example are respectively supplying a sheet of paper 28 and receiving what remains of it after the desired cut out has taken place, herein designated as 30.

The whole machine can of course be mounted on some suitable foundation, herein diagrammatically indicated at 32.

In the central portion 22, a lower horizontal backing platen 34 translates in a circular path while remaining always perfectly horizontal in the case of the first embodiment, for example. More generally, the platen moves with every one of its particles following an identical trajectory along an endless curve. Geometrically speaking, the platen is a solid body moving by pure translation in a plane, without any angular motion with respect to fixed axes of reference.

The circular motion is obtained from three identical crankshaft setups 35, 36 and 37. Each crankshaft setup would normally include at least one crank arm, at least one trunnion running in suitable bearings, and at least one pin.

More specifically, we preferably have trunnions 38, 39 and 40 on one side of the machine, together with three other identical trunnions 42, 44 and 46 on the opposite side of the machine, each of which respectively has its axis in prolongation of a corresponding different one of the three first-mentioned trunnions 38, 39 and 40. All the trunnions rotate at equal speed and each corresponding pair of trunnions forming part of the one crankshaft setup is constantly parallel to all the other trunnions.

Figure 9:
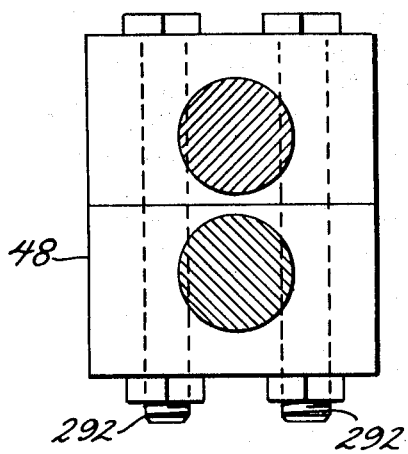
FIGS. 9 and 10 are detail views, applicable to all the embodiments herein shown, showing a typical crank arm in elevation, with associated trunnion and pin in section, illustrating the provision for adjustment of its length.
Figure 10:
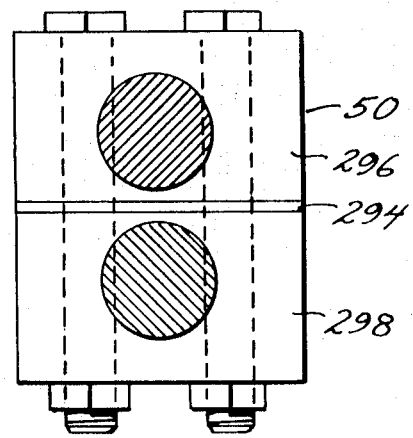

Preferably the crank arms when at their shortest length take the form exhibited by typical crank arm 48 in FIG. 9, while if adjusted to a longer position their form is that of crank arm 50 in FIG. 10.

In any case, crank arm 52 is on trunnion 38, which rides in the pair of bearings 54. Likewise, crank arm 58 is on trunnion 39, which rides in bearing pair 60 and crank arm 64 is on trunnion 40, which rides in bearing pair 66.

Similarly, on the other side, crank arm 70 is on trunnion 42, which rides in bearing pair 72. Also, crank arm 76 is on trunnion 44, which rides in bearing pair 78, and crank arm 82 is on trunnion 46 which rides in bearing pair 84.

Pin 88 interconnects crank arms 52 and 70 on corresponding-axis trunnions 38 and 42, pin 90 interconnects crank arms 58 and 76 on corresponding-axis trunnions 39 and 44, and pin 92 interconnects crank arms 64 and 82 on corresponding-axis trunnions 40 and 46, all together to form crankshaft setups 35, 36 and 37 respectively. The above pins in this embodiment are all straight pins whose axes are parallel to the axes of the two shafts, and thus the respective crank arms which are connected together rotate in unison in this embodiment.

Counterweight devices 94 and 96 are located on corresponding-axis trunnions 40 and 46, respectively, and may each take the form of a weight adjustably positioned on an arm or arms mounted on the trunnion to turn with the trunnion as in the case of counterweight 94 whose weight 98 and arm 100 are to be seen in FIG. 1. As will be seen there, the arm for the counterweight extends radially outwardly from the trunnion in a direction opposite to that of the crank arm.

There is also an upper horizontal die-platen 102, with three crankshaft setups, 103, 104 and 105, and two counterweight devices 106 and 107, all of which operate as already mentioned for the backer platen and related items, except that the crankshafts rotate in the reversed direction.

More specifically, on one side of the machine, trunnion 108 running in bearing pair 109 has crank arm 111, trunnion 113 running in bearing pair 115 has crank arm 117, and trunnion 119 running in bearing pair 121 has crank arm 123 and counterweight device 106.

Likewise, on the other side, trunnion 125 running in bearing pair 128 has crank arm 129, trunnion 137 running in bearing pair 138 has crank arm 141, and trunnion 131 running in bearing pair 133 has crank arm 135 and counterweight device 107.

Pin 144 interconnects crank arms 111 and 129 on corresponding-axis trunnions 108 and 125, pin 148 interconnects crank arms 117 and 141 on corresponding-axis trunnions 113 and 137, and pin 146 interconnects crank arms 123 and 135 on corresponding-axis trunnions 119 and 131, all together to form the three crankshaft setups 103, 104 and 105, respectively.

The structure 149 interrelating the lower crankshaft setups and the backer platen 34, and the structure 150 interrelating the upper crankshaft setups and the die platen 102 can preferably be opposite counterparts from a vertical standpoint in this embodiment.

Thus, a structure 149 supports backer platen 34. It is in turn supported on pins 88, 90 and 92, by means of the structure's bearings 152, 154 and 156 in which the respective pins rotate on one side, and the structure's bearings 158, 160 and 162, in which the respective pins rotate on the other side.

So likewise, structure 150 supports die platen 102 and is itself supported on pins 144, 148 and 146 by means of the structure's bearings for rotation of the respective pins, bearings 164, 166 and 168 being on one side and bearings 170, 172 and 174 on the other.

A single driving means 20 consists of a variable speed electric motor 178, a belt 180 and a pulley 182 mounted on one only of the various crankshaft setups mentioned, and more specifically, in the particular example shown, on trunnion 40 in crankshaft setup 37.

One pair of paper feeding rolls 184 and 186, having outside diameters equal to those of the six crankshafts, rotate in opposite directions in conjunction with the crankshafts and at the same speed. These rolls do not normally pull the paper band from the coil on the pay-off reel, or in other words supply roll 188, but retain it from going too fast under the pull of a second pair of rolls 190 and 192 which are slightly oversized or overspeeding. The two pairs of rolls 184, 186 and 190, 192 are driven synchronously with the crankshafts, either by rigid extensions of the platens pivoted on one crank on each roll shaft, or they are driven by conventional chains, gears, or belts with sprockets, gears or pulleys mounted on the trunnions of properly selected crankshafts.

Specifically, in the example shown, chain 194 driven by sprockets (not shown) on trunnion 38 drives roll 186 by means of sprockets 196, and a similar chain-and-sprocket setup 198 drives roll 184 from trunnion 108. Similarly, roll 192 is driven from trunnion 39 by chain-and-sprocket setup 200, and roll 190 is driven from trunnion 113 by chain-and-sprocket setup 202.

The reel (not shown) on which supply roll 188 is mounted is externally driven, by known means, preferably maintaining a free loop of paper strip (not shown). As a result of this setup the paper strip moves at constant speed through the machine, with known corrective devices to keep the strip well-centered.

The paper speed equals exactly the horizontal speeds of both platens 34 and 102 but only during the short distance when the die and the backer have perforately engaged into the paper thickness for the cutting operation. After the die has separated from the backer and the paper the die and the backer speeds reduce in their horizontal components, then reverse to come back for the next cut. During that revolution of the crankshafts, the paper strip keeps on going at full speed, provided that the dies have closed contours and do not destroy the continuity of the strip, to be wound as waste as part of receiving roll 204 on a standard reel (not shown) or to be chopped in small pieces of waste.

Figure 5:
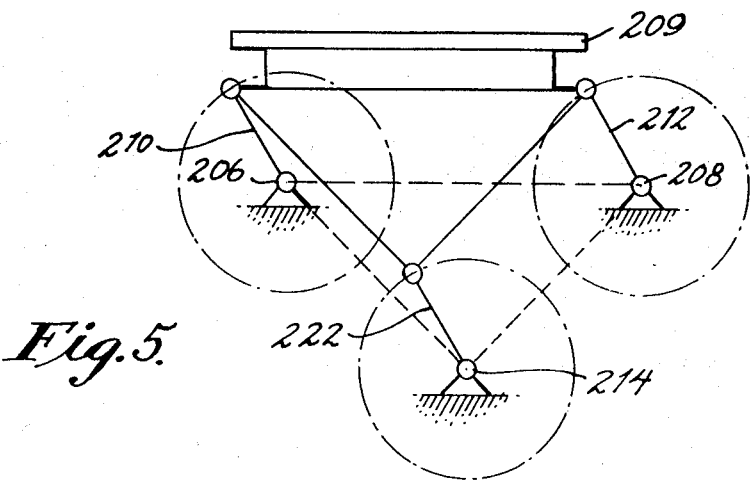
FIG. 5 is a diagrammatic view to show the operation of one of the platens in this embodiment.

The basic mechanism to translate the platen, applying equally well in principle to both the mechanism translating backer platen 34 and that translating die support 102, is shown diagramatically in FIG. 5. It consists primarily in two identical crankshafts 206 and 208, connected by their crankpins to the platen 209, and by their trunnions to the stationary base 32 in the case of the mechanism translating the backer platen, and by their trunnions to structure 267 in the case of the mechanism translating the die support. The crankshafts act as an articulated parallelogram. This arrangement is unstable when the cranks 210 and 212 line up with the platen, at which time the cranks may cease from being parallel. The preferred means to retain the parallelism is to install a third crankshaft 214 out of line with the crankshafts 206 and 208. The "dead-center" instability is then fully removed.

Figure 6:
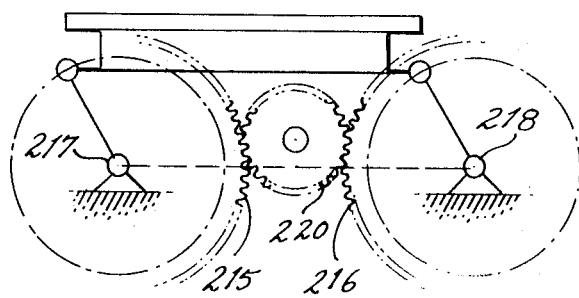
FIG. 6 is a view similar to FIG. 5, but of a second embodiment involving a different means of avoiding any dead center problem.

Another remedy shown diagrammatically in FIG. 6, could be the installation of two identical toothed gears 215 and 216 on the trunnions 217 and 218, meshing with a common idler 220 forcing the trunnions to rotate at equal speed at all times.

The variation performs like a third crankshaft and the common idler form is a possible additional form of our invention.

The triple crankshaft system assures greater rigidity and precision in the motion of the platens, because prestressed ball or roller bearings have no clearances, which is not the case for three gears in tandem. In fact, the system is hyperstatic or over-linked in all but the "dead-center" positions where the cranks 210 and 212, or 210 and 222 or 212 and 222 line up in pairs.

The following conditions are required to build satisfactory platen suspension:

(1) The 3 cranks must be identical in radii dimension. In a preferred form of execution, the radius is adjustable up to one inch in range to permit wide changes in the distance from one cut to the next on the paper strip.

(2) Assuming the stationary ball bearings are all mounted rigid on the base and one swinging ball bearing is bolted tight on the platen, then a second swinging ball bearing may be bolted tight on the platen but only when in its dead center position (lined up with the first swinging crank).

(3) Similarly, the third swinging ball bearing may be bolted tight to the platen but only when the first and third cranks line up in "dead-center" position. The adjustments are now complete because the second and third ball bearings are automatically lining up in their "dead-center" position.

Mathematical precision in the cranks' radii is not practically possible, but this is not necessary because minute errors (say up to .005") are absorbed by small elastic deformations without harm.

Figure 4:
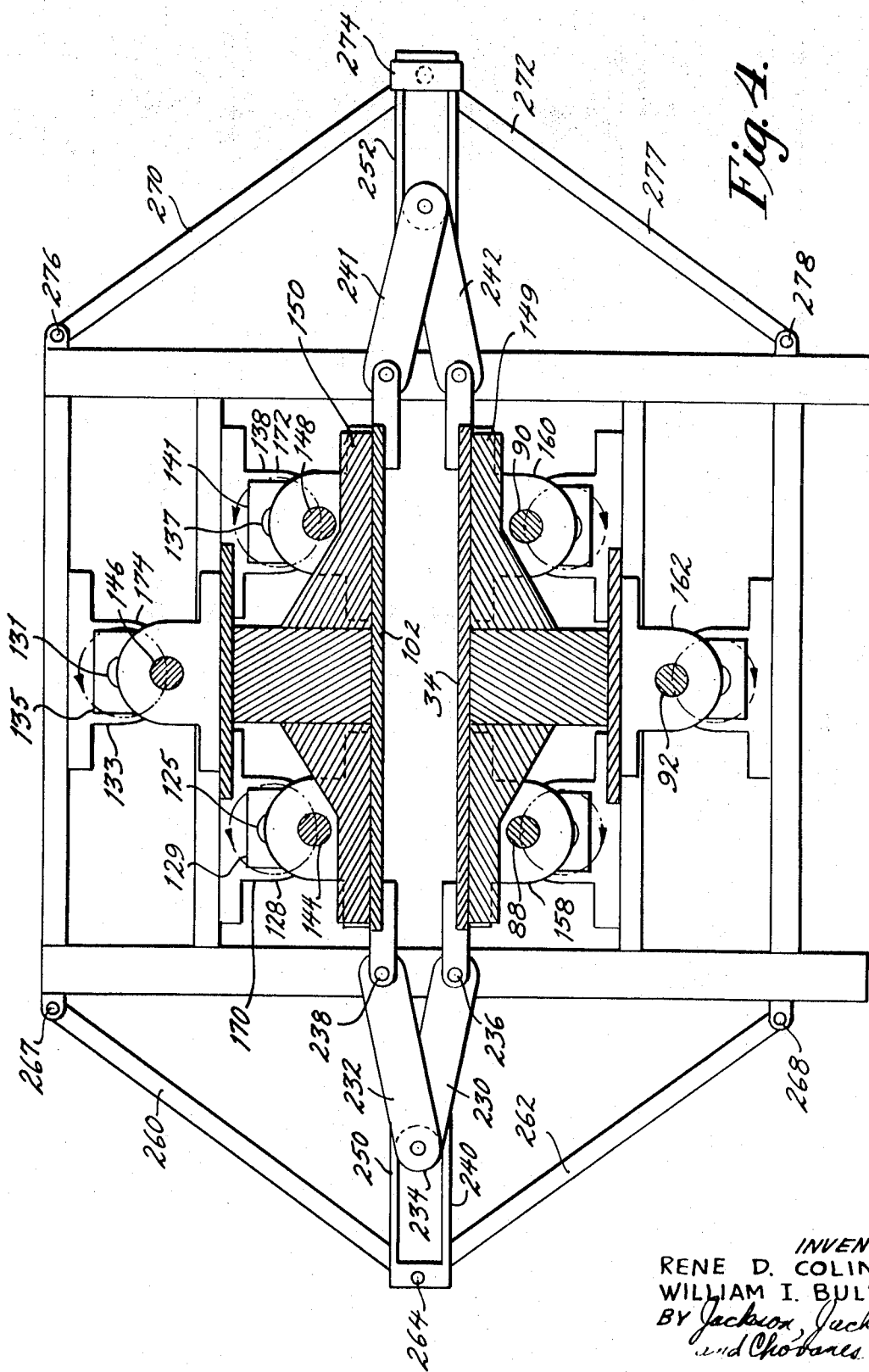
FIG. 4 is a cross sectional view along the line 4—4 of FIG. 2.

FIG. 4, especially, shows how the platens 34 and 102 (the die support) are interrelated to obtain mutual pressure by toggle-joint action, when all cranks are vertical. The linkages used for this purpose, in accordance with the invention, consist in two equal short levers 230 and 232 joined pivotally with a roller 234, while the opposite ends pivot at 236 for platen 34 and 238 for platen 102. As long as roller 234 is guided by a horizontal double track 240 (this roller may be double, if desired), located at midlevel between the pivots 37 and 38, the angles between each lever, 230 and 232, and the horizontal are equal and therefore the alignment 236–238 remains vertical as it should be. Only one of the platens 34 and 102 needs to be moved by the drive means 20. The other, undriven, platen will then move by a push and pull effect of the levers 230 and 232. In this particular example, backer platen 34 receives its drive thru the crankshaft setup 37 from drive means 20 and it is die support 102 that is in turn driven from platen 34 thru the levers, etc.

However, an instability appears by the "dead-center" effect when lever 230 or 232 lines up with the theoretical crank of the travel of pivot 236 or 238. For this reason, a second linkage 241–242, similar to the first, is provided at the other end of the platens 34 and 102. It is evident that their respective "dead-center" positions never occur simultaneously.

The arrangement above discussed, with the two lever arm setups, or in other words motion-transmission sets, 250 and 252, therein described, is really enough for the transmission of the motion. However, as a practical matter, in addition to the two lever arm setups, therein described, both of which are at one and the same side of the sheet material, there will preferably be two other similar lever setups, 254 and 256 involving double track 259, in similar locations on the other side of the sheet material, making a grand total of four of these motion-transmission sets.

Mounted on die-platen 102 is die 258, which extends downward from that die platen and is preferably a flat type of contour die, with the die edge all in the one plane that moves with the die platen.

Since the track 240 must remain at mid-distance of pivots 236 and 238 at all times, any adjustment up or down of the die platen 102 should be repeated equally in opposite direction for the backing platen 34 if the track 240 is stationary. This would impose a burdensome task on the operator. To remedy it, provision is made for the track 240, and in fact also the double track 259 on the other side of the device, to be adjusted automatically when one platen is moved and the other platen is not. New levers 260 and 262 are added, joined pivotally to one end 264 of the track 240 while the opposite ends of these levers pivot at 266 for the upper structure 267 (not the moving platen 102) and at 268 for the lower structure (not the moving platen 34). Two other levers 270 and 272 are linked pivotally to a bracket 274 which slides on track 240, while the other ends of the levers pivot at 276 and 278 to the upper and lower structures. The track 240 is correctly centered by the above adjustment setup 277, even when one structure is tilted with respect to the other for any reason.

A similar adjustment setup 279 on the other side keeps double track 259 likewise centered. The entire upper structure 267 rests on the levers of these adjustment setups and is capable of moving up and down as required by their adjustment.

Figure 8:
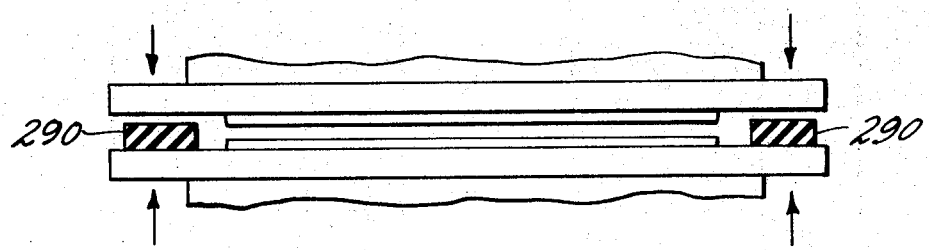
FIG. 8 is a fragmentary side elevational view applicable to all the embodiments herein shown, showing the buffer cushions, but with the die omitted.

As shown in FIG. 8 it is desirable to cushion the approach of the die to the backer in what is called a "kissing" contact. The pressure between the sharp edge of the die and the hard platen should be about 200 lbs. per linear inch of edge, but without severe impact. In the press of the invention, this approach is tangential for both trajectories, culminating when the cranks line up vertically in toggle-joint fashion. However, the large centrifugal forces resulting from high speed rotations tend to extend the radii of the cranks. A contact correctly adjusted on an idle machine would therefore be too tight when the machine would have reached high speed. One method to avoid die breakage would be to start with an open gap and then to reduce the gap gradually at high speed, until the proper contact is obtained. A safety may be provided by attaching several springs or preferably rubber cushions 290 to one of the platens. These cushions would be compressed between the platens just before the die contact, and freed just after it. During the cushion compression, the extension of the cranks would be nullified by a change into compression of the cranks, making the machine less sensitive to die damage.

Balancing the press in accordance with the invention is easy and complete by observing the following instructions (FIG. 7):

(a) Ignore any stationary parts and all revolving components having the center of gravity of each cross section located upon the axis of rotation.

(b) Parts which rotate eccentrically are arranged symmetrically with respect to the center of the shaft length.

(c) Multiply the weigh (lbs.) of each eccentrically-moving part by the distance (inches) of its center of gravity to its center of rotation to obtain the torque (inchpounds). Totalize these products for the two structures.

(d) Subtract the torque of four counterweight levers.

(e) Divide the difference by the distance selected for the counterweight lever (from the center of the steel cylinder selected for the counterweight of the center of rotation), to obtain the total weight of the four counterweights. Install one counterweight on each end of crankshafts 37 and 105. Due to their complex motion, the levers of the motion-transmission sets must be handled separately.

Their combined weight should be added to the platens for horizontal inertia but all their other motions cancel each other. No counterweight at all would be needed for vertical balancing since the upper and lower platens move with equal amplitude simultaneously and in opposite directions. However, such is not the case in the horizontal motions. The horizontal resultant inertia force is central to both structures and the same is true for all four counterweights. The resultants are therefore lined together and the accelerations are completely cancelled. The speed of the machine will not be limited by any vibrations but rather by the ability of individual components to resist the various centrifugal forces.

As already mentioned the crank radii are preferably changeable to vary the distance between two consecutive cuts in the paper. FIGS. 9 and 10 show for example a crank having a minimum radius of 1½" and a maximum radius of 2½". The change is easily accomplished in releasing the bolts 292, inserting a spacer 294 between the blocks 296 and 298 and installing new, longer bolts. The feed rolls must be modified also, either by replacing them with larger rolls, or by changing the speed ratio of their transmissions.

Figure 11:
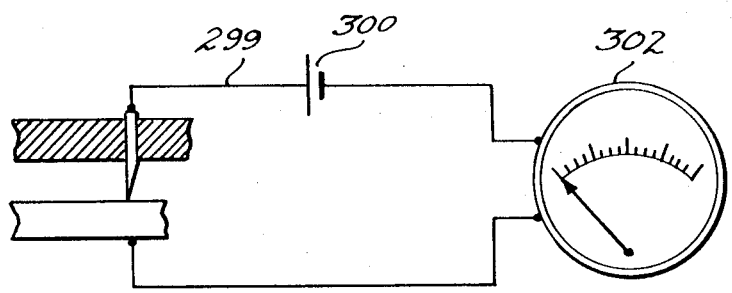
FIG. 11 is a diagrammatic view of an optional feature applicable to all embodiments, namely, a sensing means to determine contact and pressure between die and backer.

FIG. 11 illustrates a method for measuring and adjusting the pressure of the die upon the backer while the machine is in operation. In this method, the backer platen is insulated from the rest of the machine and connected to a circuit 299 comprising a low voltage dry battery 300 and a milliammeter 302. The instrument will detect current passage as soon as the sharp edge of the die touches the backer platen. The current will increase as the pressure gets heavier, even though such pressure cannot be directly estimated while the machine is in operation.

FIGS. 12 thru 15 illustrate a variation in the design of the press, applicable particularly to hard papers or plastics, to thick cardboards, corrugated cartons, etc., which require large forces to produce the cut. In the design described so far, the entire contour of the die produces the cut in one single and instantaneous vertical pressure. In the variation, a side-rolling motion is superimposed and cutting proceeds from one side that is parallel to the paper motion, continues toward the center and is completed by the opposite side. This action is obtained very simply by tilting one crank against the other, in the plane of rotation of the crank, a few degrees in each of at least 3 crankshafts of the upper or lower platen. During the rotation of the cranks, the cranks on one side reach the vertical position first. A few degrees later, the cranks of the other side would reach the vertical position after the platen has rolled like a ship in water. There is no loss of production nor speed, but a great advantage is reduced loading on the machine, due to progressive instead of instantaneous cutting. The crank dephasing could be as great as thirty degrees. All ball bearings should be of the self-aligning type.

FIGS. 12 thru 15 illustrate the mechanism just described. The three crankshafts 35, 36 and 37 of FIG. 1 have been slightly modified by advancing one crank with respect to the other in each crankshaft. This is done by having the pins no longer straight but offset, with their ends parallel to the trunnions of the crankshaft. The offset pins are shown at 310, 312 and 314, forming part of variant crankshaft setups 320, 322 and 324.

In FIG. 1, the platen 34 was bolted to the pillow-blocks of the crank pins but in FIGS. 12 thru 15, the corresponding platen 330 is no longer connected directly to the pillow-blocks. Instead, on one side the three pillow-blocks 340, 342 and 344 are rigidly related to a triangle frame 346 while on the other side the three pillow-blocks 350, 352 and 354 are rigidly connected to a second triangular frame 356. The frame 346 is connected pivotally by ball joints 362 and 364 to the two flat bars 370 and 372. Similarly, the opposite ends of the bars are pivotally connected to the frame 356 by ball joints 374 and 376.

Finally, the platen 330 rests upon the two flat bars 370 and 372 and is pivotally connected to them by two pins 380 and 382 in the middle of the bars 370 and 372. The three crankshaft setups 320, 322 and 324 rotate around their respective trunnions which are 384 and 386 for 320, 388 and 390 for 322 and 392 and 394 for 322. The three pillow-blocks 340, 342 and 344 translate together in circular trajector and likewise for the three pillow-blocks 350, 352 and 354, but one set is dephased circularly to the other. The two flat bars 370 and 372 have identical wobbling motions. The platen 330 has a complex motion which is a rocking or oscillatory motion around the axis running between their centers, superimposed on a translation as in FIG. 1 along a circular trajectory.

FIG. 15 shows diagrammatically the interrelation between a given corresponding set of crank arm above and below the work during the cutting operation in this embodiment.

Crank arms 400 and 402 represent the two crank arms forming part of a given crankshaft setup below the work and crank arm 404 represents both crank arms in a given such setup above the work. The leftmost part of the figure shows crank arm 400 in a vertical upward position, with crank arm 402 somewhat behind in phase, and crank arm 404 at an intermediate phase relative to its vertical downward position. In the middle part of the figure, crank arm 404 has reached its vertical downward position, while crank arms 400 and 402 are on opposite sides of their vertical upward positions. In the rightmost part of the figure crankarm 402 has reached its vertical upward position, while crank arm 400 is beyond its vertical position and crank arm 404 intermediately so.

It will be seen from this that the vertical spacing between the respective crankpin ends remains nearly constant during the rocking motion, so that the die never loses contact with the backer platen 34 during the cutting operation.

While the above description of our device has been specific to a machine in which the work is a single sheet coming from a single roll, it is possible also to feed multiple sheets from multiple rolls, or in packed form, into a position where they will be passing thru together between the upper and lower part of the machine and to cut the multiple sheets in the one single cut by die against backer platen. In such a case, the die will be active as a cutter in a greater portion of its circular motion, part of which will therefore have a slower horizontal component of the velocity. As a result, a free loop will tend to form in the sheet material between the feeding rolls and the cutting portion of the machine while the cutting is going on, which free loop will tend to disappear after the cutting part of the cycle is over for that particular cycle, until a new cutting portion begins.

It will be evident that when cutting of materials in sheet form is mentioned, this includes cutting of multiple sheets as well as a mere single sheet.

The machine of our invention intended generally for use on paper-type material, by which is meant paper, cardboard and other forms of material made from paper pulp, and can also be used on metal foil or plastic having comparable cutting characteristics.

In view of our invention and disclosure variations and modifications to meet individual whim or particular need will doubtless become evident to other skilled in the art,

Having thus described our invention, what we claim as new and desire to secure by Letters Patent is:

1. A rotary die-cutting press for materials in sheet form, operating by pure translation of a plane die platen and a plane backer platen, where all particles of the die platen follow closed trajectories which are all identical in size, shape and orientation, but not in position, and where all particles of the backer platen follow another set of closed trajectories of similar character, with the trajectories of the cutting points of the die contacting tangentially the trajectories of the corresponding points of the backer platen, said contacts being divested of slippage between the die, the backer and the sheet at the time of cutting, all of the trajectories being circular and all of said particles moving at constant amount of speed, the same for all particles including the sheet material, the die platen and the backer platen being supported from a stationary base by mechanisms including two conjugated parallelograms, one for each platen, which parallelograms respectively revolve synchronously in opposite directions to each other, said parallelograms comprising each two identical cranks and being provided with devices preventing dead center instability, in which the said device consists of a third crank located outside the straight alignment of the said two identical cranks.

2. A rotary die-cutting press for materials in sheet form, operating by pure translation of a plane die platen and a plane backer platen, where all particles of the die platen follow closed trajectories which are all identical in size, shape and orientation, but not in position, and where all particles of the backer platen follow another set of closed trajectories of similar character, with the trajectories of the cutting points of the die contacting tangentially the trajectories of the corresponding points of the backer platen, said contacts being divested of slippage between the die, the backer and the sheet at the time of cutting, all of the trajectories being circular and all of said particles moving at constant amount of speed, the same for all particles including the sheet material, the die platen and the backer platen being supported from a stationary base by mechanisms including two conjugated parallelograms, one for each platen, which parallelograms respectively revolve synchronously in opposite directions to each other, said parallelograms comprising each two identical cranks and being provided with devices preventing dead center instability, where the synchronization between the two parallelograms rotating in opposite directions is obtained by two pairs of straight identical levers pivotally connected each to one end of a platen and connected together at the other ends of the levers, by pairs, to rollers guided parallel to the platens and at mid distance between them.

3. A rotary die-cutting press for materials in sheet form, operating by pure translation of a plane die platen and a plane backer platen, where all particles of the die platen follow closed trajectories which are all identical in size, shape and orientation, but not in position, and where all particles of the backer platen follow another set of closed trajectories of similar character, with the trajectories of the cutting points of the die contacting tangentially the trajectories of the corresponding points of the backer platen, said contacts being divested of slippage between the die, the backer and the sheet at the time of cutting, all of the trajectories being circular and all of said particles moving at constant amount of speed, the same for all particles including the sheet material, the die platen and the backer platen being supported from a stationary base by mechanisms including two conjugated parallelograms, one for each platen, which parallelograms respectively revolve synchronously in opposite directions to each other, said parallelograms comprising each two identical cranks and being provided with devices preventing dead center instability, comprising resilient cushions between the platens to reverse stresses in the cranks before and after contact has been obtained between the die and the backer.

4. A rotary die-cutting press for materials in sheet form, operating by pure translation of a plane die platen and a plane backer platen, where all particles of the die platen follow closed trajectories which are all identical in size, shape and orientation, but not in position, and where all particles of the backer platen follow another set of closed trajectories of similar character, with the trajectories of the cutting points of the die contacting tangentially the trajectories of the corresponding points of the backer platen, said contacts being divested of slippage between the die, the backer and the sheet at the time of cutting, all of the trajectories being circular and all of said particles moving at constant amount of speed, the same for all particles including the sheet material, the die platen and the backer platen being supported from a stationary base by mechanisms including two conjugated parallelograms, one for each platen, which parallelograms respectively revolve synchronously in opposite directions to each other, said parallelograms comprising each two identical cranks and being provided with devices preventing dead center instability, in which the mechanism supporting one of the platens includes two such parallelograms associated side by side and revolving in the same direction but with a small dephasing of one crank against its mate, said dephasing being fixed and not over thirty degrees.

5. A rotary die-cutting press for materials in sheet form, operating by pure translation of a plane die platen and a plane backer platen, where all particles of the die platen follow closed trajectories which are all identical in size, shape and orientation, but not in position, and where all particles of the backer platen follow another set of closed trajectories of similar character, with the trajectories of the cutting points of the die contacting tangentially the trajectories of the corresponding points of the backer platen, said contacts being divested of slippage between the die, the backer and the sheet at the time of cutting, in combination with means for passing an electric current between the die platen and the backer platen and means for measuring the variation in electrical resistance of the contact between the die platen and the backer platen as a function of pressure between the platens.

6. A machine for contour cutting of paper-type material by means of a die, which machine comprises:
 (a) two pairs of rolls adapted to progress the paper-type material in sheet form horizontally in a particular direction between them;
 (b) a first set of three trunnions extending parallel to each other at right angles to the above direction of the material and rotatably mounted between the pairs of rolls and near and lower than one edge of the sheet, two of the trunnions being in the same more or less horizontal plane and the third being in a lower position between the other two;
 (c) a second set of three trunnions, each respectively rotatably mounted at a position near and lower than the other edge of the sheet but otherwise corresponding to the position of a respective corresponding one of the first three;
 (d) a first set of equal-length crank arms each mounted on a different one of the trunnions;
 (e) a first set of pins each extending across between the ends of a different pair of crank arms on corresponding-positioned pairs of trunnions to ensure that each such pair of trunnions will rotate at the same speed;
 (f) a first pair of structures rigidly interconnecting and riding upon the above set of pins, one near each edge of the work, and at the same time permitting the rotation of the pins relative to the structures, so that the three pins will revolve at the same rate of speed and the structures will follow a motion path dictated by this revolution;

(g) rotational driving means for one of the above trunnions;

(h) a backer platen mounted on and moving at least mainly with the above structures, to present a substantially horizontal face which is upwardly directed, is located in a position below the sheet, and is adapted to constitute a backer for the die-cutting of the sheet;

(i) a third and fourth set of three trunnions, a second set of crank arms, a second set of pins and a second pair of structures of which everything that is said above in this claim, subsections (b) thru (f), about the first and second set of three trunnions and the first set of crank arms and pins and pair of structures, respectively is likewise respectively true, except that the third and fourth set of trunnions, and the second set of crank arms, pins and pair of structures are all higher than the sheet and the third trunnion of each set is higher than the first and second trunnion of each set;

(j) a die support mounted upon and moving with the second pair of structures;

(k) a die mounted on and moving with the die support and facing downward from it in a position in which the cutting edge will be above the sheet most of the time;

(l) four motion-transmission sets, each having a stationary roller-guideway extending horizontally, a roller running in the guideway, and two equal-length lever arms attached to the roller in a manner not to rotate with it but to swing in the arm's own segment of a circle perpendicular to the axis of the roller and having a center which moves with the roller, the segment of one of the two lever arms extending at least somewhat upwardly from its center and the segment of the other of the two lever arms extending at least somewhat downwardly from its center, each one of these motion-transmission sets being respectively near a different one of the four corners, horizontally considered, of the overall setup involved in the four sets of trunnions, and the lever arm whose segment extends at least somewhat downwardly from its center being attached in each case to the setup including the backer and the first pair of structures, and the lever arm whose segment extends at least somewhat upwardly from its center being attached in each case to the setup including the die support, die and second pair of structures;

(m) cushions on the backer platen outside the position of the die and extending upward toward the die support; and (n) the entire foregoing being so interrelated as to move the die in a rotary motion with the die constantly facing downwards, to move the backer in a rotary motion at least somewhat corresponding horizontally but at least more-or-less opposing vertically, with the backer constantly facing upwards, and to have in a particular part of those rotary motions the die and backer both mainly traveling close to each other and to the sheet of paper-type material with all three mainly traveling in approximately the same direction, but with the travel of the die and the backer having a component which brings them, from a position away from each other with the sheet in between, toward each other sufficiently to effect the desired cut of the sheet by the die and then away from each other sufficiently to permit clearance of the remainder of the sheet from the other two.

7. A machine according to claim 6, in which the pins extend straight in a line parallel to the trunnions, and the motions of the die and backer exactly correspond to each other in their horizontal components and exactly oppose each other in their vertical components.

8. A machine according to claim 6, in which the individual pins of the first set of pins are so constructed as to keep the respective crank arms at their opposite ends in a predeterminedly rotationally offset position, the crank arms on one side relative to those on the other, the motion transmission sets all connect to the backer platen at points along the center line of the travel of the sheet, and the various elements are so interrelated that the motion of the backer platen, if considered relative to that of the die, includes a rocking component from side to side, and one side of the backen platen reaches its highest point somewhat before the die reaches its lowest point, and the other side of the backer platen reaches its highest point somewhat after the die reaches its lowest point.

9. A machine according to claim 6, in which there are two additional separate relatively adjustably movable structures upon one of which the part of the machine between the pairs of rolls which is lower than the moving sheet material is mounted and upon the other of which the part of the machine between the pairs of rolls which is higher than the moving sheet material is mounted, with four adjustment balancing devices, one near each corner, horizontally speaking, of the part of the machine which is between the pairs of rolls, each of these four devices having a pair of equal-length lever arms, the pair being relatively swingably joined together at one end and each one of the given pair being attached respectively to a different one of the additional structures at the other end, with the two devices nearest one pair of rolls each having their two lever arms separately pivoting around points each fixed to the respective nearest roller guide, and the two devices nearest the other pair of rolls each having their two lever arms separately pivoting around points each longitudinally movable along the respective nearest roller guide.

10. A machine according to claim 6, in which there is an electrical circuit, including a source of electrical current which circuit extends thru the die and backer platen in such a way that change in pressure between die and backer platen will change the amount of the current at a particular point in that circuit, and an ammeter to measure the current at that point in the circuit.

11. A machine according to claim 6, in which the features described in items (b) thru (f) therein below the level of the sheet material are each of them an opposite counterpart to the corresponding feature described in (i) therein above the level of the sheet material, in the sense that in each case they are the same in size and weight and horizontal position and horizontal motion and have equal and opposite vertical motion, and there are additionally respective counterweights mounted on trunnions corresponding to each other above and below to have opposite horizontal components of motion to the moving parts above and below respectively, and being of weights to keep the part of the machine on the trunnions horizontally balanced throughout its motion.

12. A machine according to claim 6, in which the crank arms each include two pieces bolted together, one located on the trunnion and the other located on the pin, adapted to have spacers inserted in between to change the distance between trunnion and pin.

13. A process of contour cutting of work comprising running the work in a particular direction at a certain speed, having a flat die adapted to make a contour cut and having a backer, bringing the die and backer to a position and travel where they are both facing each other and travelling at approximately that same speed in approximately that same direction with the work sandwiched in between them, bringing the die and backer from that position towards each other sufficiently to contour cut the work, and, with the die and backer located in moving planes which keep more or less parallel to each other during their motion, imparting a relative rocking motion between the planes, which rocking motion goes from side to side relative to the travel of the work and causes one side of the die and platen to have the various relative positions of their cutting travel respectively at least slightly in advance of the corresponding relative positions of the cutting travel of the other side of the die and platen.

14. A rotary die-cutting press for materials in sheet form, operating by pure translation of a plane die platen and a plane backer platen, where all particles of the die platen follow closed trajectories which are identical in size, shape and orientation but not in position, and where all particles of the backer platen follow another set of closed trajectories of similar character, with the trajectories of the cutting points of the die contacting tangentially the trajectories of the corresponding points of the backer platen, said contacts being divested of slippage between the die, the backer and the sheet at the time of cutting, all trajectories being circular and all particles moving at constant peripheral speed, the same for all particles including the sheet material, the die platen and the backer platen being supported from a stationary base by mechanisms including two conjugated parallelograms one for each platen which parallelograms respectively revolve synchronously in opposite directions to each other, said parallelograms comprising each two identical cranks and crank pins, the crank pins from side to side being bent so that corresponding cranks on opposite sides of the platens are at different angular positions.

References Cited

UNITED STATES PATENTS

| | | | |
|---|---|---|---|
| 2,407,254 | 9/1946 | Conner | 83—321 X |
| 3,203,288 | 8/1965 | Blumer | 83—328 X |
| 3,296,910 | 1/1967 | Haskin, Jr. et al. | 83—328 |
| 3,333,495 | 8/1967 | Stuchbery et al. | 83—328 X |

JAMES M. MEISTER, Primary Examiner

U.S. Cl. X.R.

83—321, 328, 522; 100—151, 222